Patented June 24, 1930

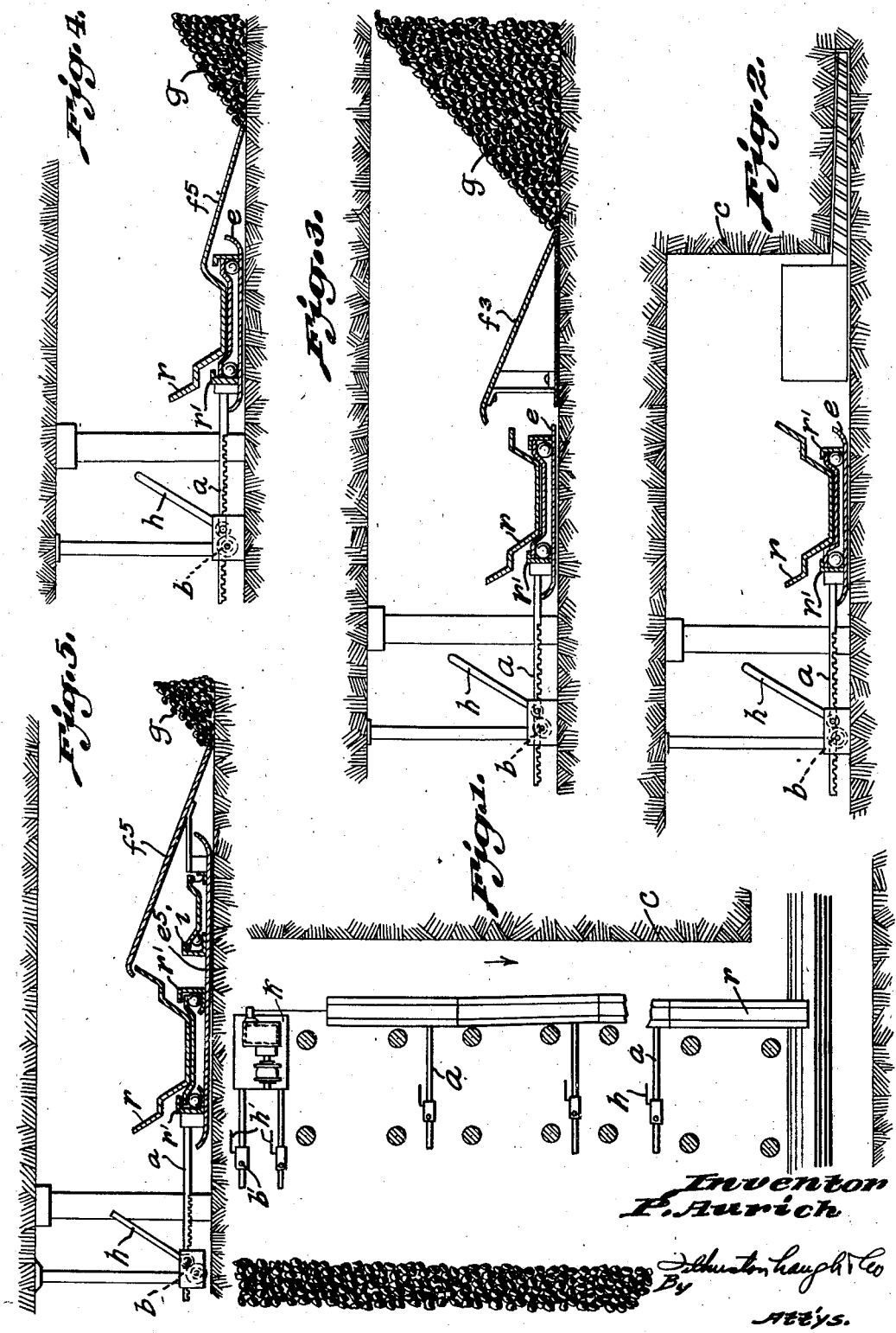

1,767,425

UNITED STATES PATENT OFFICE

PETER AURICH, OF BOCHUM, GERMANY, ASSIGNOR TO THE FIRM GEBR. EICKHOFF, MASCHINENFABRIK, OF BOCHUM, GERMANY

SHAKING CONVEYER

Application filed October 15, 1927, Serial No. 226,481, and in Germany July 27, 1927.

The invention relates to shaking conveyers in particular intended to be used in mining service. In order to follow the exhaustion of the seam, shaking conveyers of this type must be hitherto disassembled after exhaustion, and assembled anew at the new stope. To save the time-consuming work required for this disassemblage and reassemblage of the shaking conveyer, the conveyer or its guideways are equipped according to the invention with feeding means, by the aid of which the conveyer may be shifted transversely of its longitudinal direction. To diminish the frictional resistances, the guideways of the shaking conveyer may further be fitted with runners or the like. The driving motor of the conveyer is advantageously likewise mounted so as to be shifted. Furthermore, in particular in cases, where the conveyer cannot be slid laterally close to the material to be conveyed, a ramp is inserted according to the invention between the conveyer and the material, over which ramp the material may be supplied to the conveyer with little expense of lifting work.

In order to allow of the invention to be more easily understood, some preferred embodiments of same are illustrated by way of example in the drawing which accompanies and forms part of this specification.

In this drawing:

Fig. 1 is a top view of a shaking conveyer fitted with means for lateral shift,

Fig. 2 is a corresponding cross-sectional view in enlarged scale,

Fig. 3 is a similar sectional view of a transversely shiftable conveyer combined with a loading ramp stationary relatively to the conveyer, Fig. 4 is a similar sectional view of a transversely shiftable conveyer in combination with a loading ramp united therewith, and Fig. 5 is a similar sectional view of a transversely shiftable conveyer with a loading ramp which is adapted to take part in the transverse shifting motion, but adapted to execute longitudinal movements relatively to the conveyer.

Referring first to the embodiment illustrated in Figs. 1 and 2, $r$ denotes the shaking conveyer, to the guideway $r^1$ of which is attached a device for transversely shifting this guideway, this device consisting of a rack $a$ and pinion $b$ in mesh therewith, which latter may be rocked by means of a hand lever $h$. Instead of this pushing means described, a pull means may be employed, such as ropes or chains. In order to diminish the frictional resistance, runners $e$ may be arranged below the guideways $r^1$, as shown. When the guideways $r^1$ are shifted transversely of the longitudinal direction of the conveyer by means of the described racks and pinions, the conveyer $r$ itself, supported on these guideways $r^1$, is likewise shifted toward the mineral $c$ to be mined.

The described shifting motion of the conveyer may take place either over its entire length or sectionally, as in the most cases the joint connections existing between the individual sections of the conveyer have a certain play allowing a slight mutual angular displacement of the conveyer sections, or the joints may be altered to permit this displacement.

In order to allow the drive $d$ of the conveyer, see Fig. 1, to easily follow the shifting motion of the conveyer, a transversely acting shifting device is provided for this drive too, which device may be designed like that of the conveyer. In this case the housing the drive $d$ or its base frame $k$ is preferably likewise equipped with runners, to diminish the frictional resistance.

In those cases, where the shaking conveyer cannot be shifted close to the material to be conveyed, a ramp of suitable length is advantageously interposed between the conveyer and the material. This ramp may be stationary or designed to be shifted transversely or moved longitudinally with the conveyer. Fig. 3 shows such a ramp $f^3$, which is stationary beside the transversely shiftable conveyer $r$ opposite the material $g$ to be conveyed, which is then easily slid over this ramp into the conveyer.

In the embodiment illustrated in Fig. 4 the ramp $f^4$ is united with the shaking conveyer $r$, so that it positively moves, in the transverse shift, and also in the shaking motions of the latter. In this case it will be advantageous to impart to the conveyer a shaking motion which is directed somewhat obliquely to its longitudinal direction, this being obtained in simple manner by obliquely arranging the guideways $r^1$ of the conveyer.

In the embodiment illustrated in Fig. 5 the conveyer $r$ and the ramp $f^5$ are mounted on a common runner $e^5$, so that these two parts are shifted transversely together by the shifting device $a$, $b$. Besides, the conveyer and the ramp are adapted to execute independent longitudinal motions of the runner $c^5$. Furthermore, by arranging the guideways $i$ of the ramp obliquely, a shaking motion may be imparted to the ramp $f^5$, which is directed obliquely to the longitudinal direction of the shaking conveyer.

I claim

1. A shaking conveyer and a loading ramp arranged alongside thereof, means for shifting said conveyer and said ramp together transversely of the longitudinal direction of the conveyer, and means for imparting independent shaking motions to said conveyer and to said ramp.

2. A shaking conveyer and a drive connected to it, means for shifting said conveyer and said drive transversely of the longitudinal direction of said conveyer, and a loading ramp arranged alongside the latter.

3. A shaking conveyer of the character described comprising a longitudinally reciprocable conveyer element equipped with supporting means permitting the conveyer element to be shifted bodily in a lateral direction, and shifting mechanism connected to said supporting means.

4. A shaking conveyer of the character described comprising a longitudinally reciprocable conveyer element equipped with supporting means permitting the conveyer element to be shifted bodily in a lateral direction and a shifting mechanism connected to said supporting means and operable to exert pressure thereon in a direction transversely of the length of said supporting means and conveyer element.

5. A shaking conveyer of the character described comprising conveyer elements, fixed guideways in which said conveyer elements are longitudinally reciprocable and a shifting mechanism connected to said guideways and operable to effect bodily shifting of the guideways and conveyer elements in a lateral direction.

6. A structure as recited in claim 5 including transversely arranged anti-frictional glide members underlying and supporting said guideways.

7. A shaking conveyer of the character described comprising a longitudinally reciprocable conveyer element, a drive mechanism connected to said conveyer element to effect reciprocation thereof, said conveyer element and drive mechanism being equipped with supporting means permitting shifting thereof in a transverse direction with respect to the longitudinal axis of the conveyer element and shifting mechanism connected to said supporting means to effect and control the aforesaid shifting of the conveyer element and drive mechanism.

8. A shaking conveyer of the character described comprising a longitudinally reciprocable conveyer element, a drive mechanism connected to and controlling reciprocation of said conveyer element, runners supporting said conveyer element and said drive mechanism to facilitate bodily shifting thereof in a lateral direction with respect to the longitudinal axis of the conveyer element and shifting mechanism connected to said conveyer element and said drive mechanism to effect and control lateral shifting thereof.

9. A shaking conveyer of the character described comprising a longitudinally reciprocable conveyer element, means for effecting lateral displacement of said conveyer element and a loading ramp positioned to extend along one of the longitudinal sides of the conveyer element.

10. The structure recited in claim 9 including means for effecting lateral displacement of the loading ramp.

11. A shaking conveyer of the character described comprising a longitudinally reciprocable conveyer element adapted to be arranged along side the working face or stope of a mine tunnel, means for effecting lateral displacement of the conveyer element to position same closer to said working face or stope as occasion arises, a shifting mechanism arranged at the side of the conveyer remote from said working face or stope and connected to the conveyer to effect and control lateral displacement thereof and a loading ramp rigidly connected to one of the longitudinal sides of the conveyer element and projecting laterally from the conveyer element in the direction of said working face or stope.

In testimony whereof, I have signed my name to this specification this 23rd day of September, 1927.

PETER AURICH.